United States Patent
Jankovic et al.

(10) Patent No.: US 6,488,008 B1
(45) Date of Patent: Dec. 3, 2002

(54) METHOD AND SYSTEM FOR DETERMINING THE VARIABLE CAM TIMING RATE-OF-CHANGE IN AN ENGINE

(75) Inventors: Mrdjan J. Jankovic, Birmningham, MI (US); Stephen William Magner, Lincoln Park, MI (US)

(73) Assignee: Ford Global Technologies, Inc., Dearborn, MI (US)

(*) Notice: Subject to any disclaimer, the term of this patent is extended or adjusted under 35 U.S.C. 154(b) by 49 days.

(21) Appl. No.: 09/681,746

(22) Filed: May 31, 2001

(51) Int. Cl.$^7$ ................................................ F02D 7/00
(52) U.S. Cl. ..................................... 123/399; 123/90.15
(58) Field of Search ............................ 123/399, 90.15, 123/90.16, 90.17, 90.31, 90.6, 319

(56) References Cited

U.S. PATENT DOCUMENTS

| | | | |
|---|---|---|---|
| 4,759,321 A | * | 7/1988 | Matsumoto et al. ..... 123/90.15 |
| 5,245,968 A | | 9/1993 | Kolias et al. |
| 5,690,071 A | | 11/1997 | Jankovic |
| 5,736,633 A | | 4/1998 | Magner et al. |
| 6,415,753 B1 | * | 7/2002 | Nagaosa et al. ......... 123/90.15 |

* cited by examiner

Primary Examiner—Bibhu Mohanty
(74) Attorney, Agent, or Firm—Brooks & Kushman PC (57) ABSTRACT

An internal combustion engine having variable camshaft timing that incorporates a method of determining the position of the variable cam timing phasing system for controlling the flow of intake and exhaust gases during the combustion process. The method includes the steps of creating a model for estimating a calculated cam position and a calculated rate-of-change of the cam position. The method also includes the step of measuring a measured cam position and a measured rate-of-change of the cam position. The calculated cam position is compared to the measured cam position and calculated rate-of-change of the cam position and measured rate-of-change of the cam position that are blended based upon a comparison of the two values. The engine controller is adjusted dependent upon the blended rate-of-change of the cam position.

15 Claims, 5 Drawing Sheets

METHOD AND SYSTEM FOR DETERMINING THE VARIABLE CAM TIMING RATE-OF-CHANGE IN AN ENGINE

BACKGROUND OF INVENTION

1. Field of the Invention

This invention relates to internal combustion engines using variable camshaft timing.

2. Background Art

In conventional engines, the timing between the crankshaft and camshafts is rotationally fixed. Recently, engines have been improved by including mechanisms for automatically advancing or retarding camshaft rotation relative to the rotation of the crankshaft. By providing automatic advance or retard, it is possible to maximize fuel economy and minimize emissions in the engine's exhaust. It is also possible to increase the peak torque and improve fuel economy by optimizing the phase angle relationship of the camshaft relative to the crankshaft.

Phase shift control is provided by a hydraulic coupler that rotationally couples the camshaft drive sprocket to a camshaft flange. An engine control data processor monitors continuously varying engine operating conditions and provides a control signal to the hydraulic coupler to set the desired relative phase angle for the engine operating conditions. Variable camshaft timing systems have been developed with the objective of correcting the air charge drop during camshaft retard that may result in a dip in torque response. One example of this approach is disclosed in U.S. Pat. No. 5,690,071 which discloses a method for adjusting the variable camshaft timing induced air variation that uses the air bypass valve to compensate for induced air charge variation. The patent also proposes the use of an electronically-controlled throttle that compensates for induced air change variation.

While this approach improves the performance of the variable camshaft timing system in normal circumstances, the use of a measured cam position and cam rate-of-change values is based on a signal that includes oscillations and a high degree of signal filtering. Signal filtering causes delays in response to the continuously varying engine operating conditions that may result in a reduction in torque response or increase in emissions.

To minimize delay caused by filtering measured signals, it has been proposed to use a model of the variable camshaft timing rate-of-change to control engine operation. Under cold-start conditions wherein the engine oil is cold and highly viscous, or if inadequate oil is available to the engine, the hydraulic device rotationally coupling the camshaft drive sprocket to the camshaft flange may be substantially retarded relative to the model. Under these operating conditions, the model of the variable camshaft timing rate-of-change if used to control an engine operating system would be less effective than the measured camshaft timing approach proposed in U.S. Pat. No. 5,690,071.

There is a need for an internal combustion engine having a variable camshaft timing system that minimizes delays caused by filtering oscillations in a measured camshaft position based system, but that includes a measured camshaft position system for controlling the camshaft position under cold-start or when low-oil pressure is encountered by the engine.

The present invention addresses the above problems and fulfills the need for a system that maximizes the benefits of variable camshaft timing as summarized below.

SUMMARY OF INVENTION

According to the present invention, a method of determining the position of a variable cam timing phasing system for an engine having an engine controller that controls the flow of intake and exhaust gases during the combustion process is provided. The method comprises the steps of creating a model for estimating a calculated cam position and a calculated rate-of-change of the cam position. The method also includes the step of measuring an actual cam position and an actual rate-of-change of the cam position. According to the method, the calculated cam position is compared to the measured cam position and the calculated rate-of-change of the cam position and measured actual rate-of-change of the cam position are blended based upon the comparison. The engine controller is adjusted dependent upon the blended rate-of-change of the cam position.

According to another aspect of the invention, an algorithm based upon test data and simulations is provided for estimating the calculated rate-of-change of the cam position.

Based upon another aspect of the invention, an algorithm has been developed for blending the estimated and measured actual cam positions and measurement based rate-of-change of the cam position.

According to yet another aspect of the invention, the engine controller may be an electronic throttle control. The engine may have a dual equal cam with equal phase intake and exhaust cams that are advanced and retarded equally relative to the crankshaft. Alternatively, the invention could be used in conjunction with an idle speed valve system and other forms of variable cam timing systems including exhaust only or dual independent cams.

The invention also relates to the engine controller using the calculated cam position and calculated rate-of-change of the cam position when the comparison of the calculated cam position to the measured cam position is below a threshold value. The engine controller uses the measured cam position and measured rate-of-change of the cam position when the comparison of the calculated cam position to the measured cam position is above a high threshold value. When the comparison of the calculated cam position to the measured cam position is above the low threshold value and below the high threshold value, the engine controller uses a blended rate-of-change based on the comparison and further based upon the calculated rate-of-change and measured rate-of-change of the cam position.

According to another aspect of the invention, a method of determining a blended rate-of-change of a cam position in an internal combustion engine having a variable phase cam timing system is proposed that includes a first step of determining a reference cam position. The next step of the method is to utilize a model to determine an estimated cam position and an estimated rate-of-change of the cam position. The system measures an actual cam position and determines a filtered rate-of-change of the actual cam position based upon the measurement. The model estimated cam position is compared to the measured actual cam position. The method further includes the step of determining the blended rate-of-change of the cam position based on the comparison, and further based on the estimated rate-of-change of the cam position and the filtered rate-of-change of the cam position.

The invention may also be seen as a system for determining the rate-of-change of a cam position for an internal combustion engine having a crankshaft and a camshaft. The internal combustion engine includes a variable phase cam timing system that alters a phase relationship between the camshaft and the crankshaft. The system comprises a data processor having a model for determining an estimated cam position relative to a reference cam position and also estimating a rate-of-change of the cam position. A sensor is provided for measuring an actual cam position and a data processor includes a filtering algorithm for determining the filtered rate-of-change of the actual cam position. The data processor compares the estimated cam position to the measured actual cam position and determines a blended rate-of-change of the cam position based upon the comparison, and further based on the estimated rate-of-change of the cam position and the filtered rate-of-change of the cam position.

These and other aspects of the present invention will be better understood in view of the attached drawings and detailed description of the invention.

DETAILED DESCRIPTION

Figure 1:
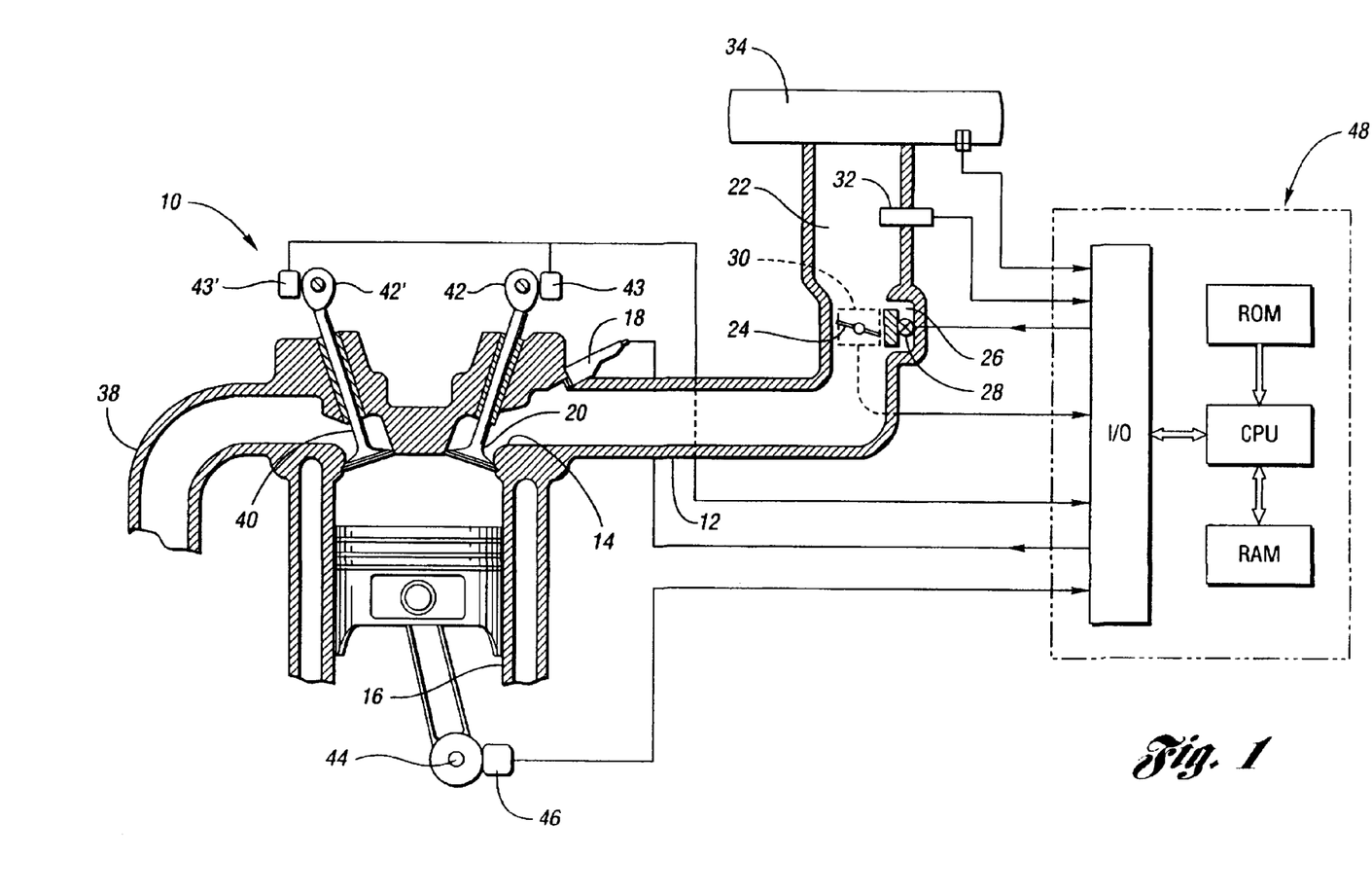
FIG. 1 is a schematic cross-sectional view of an internal combustion engine.

Referring now to FIG. 1, an internal combustion engine 10 having a dual equal variable camshaft timing (VCT) mechanism is shown. The engine 10 includes an intake manifold 12 and an intake port 14. The intake port opens into one of a plurality of cylinders or combustion chambers 16. A fuel injector 18 is associated with each intake port 14 near an intake valve 20 of each cylinder 16. While the disclosure illustrates a port injected engine, the invention is also applicable to direct injection engines and diesel engines.

The intake manifold 12 is connected to an induction passage 22 that includes a throttle valve 24 and bypass passage 26. The bypass passage 26 provides a bypass around the throttle valve 24 and includes an air bypass valve 28 that is used to control the idle speed of the engine.

A position sensor 30 is provided to sense the angular position of the throttle valve 24. The induction passage 22 may include a mass flow sensor 32 and has an air cleaner system 34 at one end. The engine 10 includes an exhaust manifold 38 that is connected to each combustion chamber 16. Exhaust gases generated during combustion in each cylinder 16 are released through an exhaust valve 40. Cam shafts 42, 42 N are provided to actuate the intake valve 20 and exhaust valve 40, respectively. The position of the cam shafts 42, 42 N are monitored by camshaft position monitors 43, 43 N. The crankshaft 44 of the engine 10 is monitored by a crank angle detector 46 that is used to detect the rotational position of the crankshaft 44. An onboard computer 48 including ROM, RAM, CPU and I/O contains engine control programs. According to the present invention, the computer stores a cam schedule in the form of a lookup table using throttle position entry points to determine the camshaft timing. The ROM also may store an air bypass valve schedule. As described below, the computer 48 is adapted to receive input signals and provide output control signals for controlling the process of internal combustion in the engine 10.

The method of the present invention will be described with reference to the flow chart of FIG. 2. The method begins with the system determining a reference or desired cam position at 50. The reference cam position is provided to a model 52 that generates an estimated cam rate-of-change signal that is provided to line 54 and an estimated cam position that is provided to line 56. A suitable model is a closed loop model based on cam position, that after the summer, includes gain with a limiter followed by an integrator. According to the method, the actual cam position is measured at 60 and the cam position signal is provided at line 62 to a filter at 64 that provides a filtered measured cam rate-of-change value on line 66. A suitable filter is a second order filter followed by a differentiator. The model estimate of the cam position is compared to the measured cam position at 70. The comparison is then provided to a filter at 72 that filters the comparison. A suitable filter is a first order filter. The output of the filter is provided to the soft switch logic at 74. The signal from soft switch logic 74 is provided to line 76. At 80, the estimated cam rate-of-change from line 54, filtered measured cam rate-of-change at line 66, and blend provided by the soft switch logic 74 on line 76 are processed and an allocation is made between the model and the measured rate-of-change. The result of the allocation is provided at 82 to establish a blended rate-of-change of cam position. The blended rate-of-change of cam position is used to provide a control action for the engine that depends on the variable cam timing phase rate-of-change value.

Figure 2:
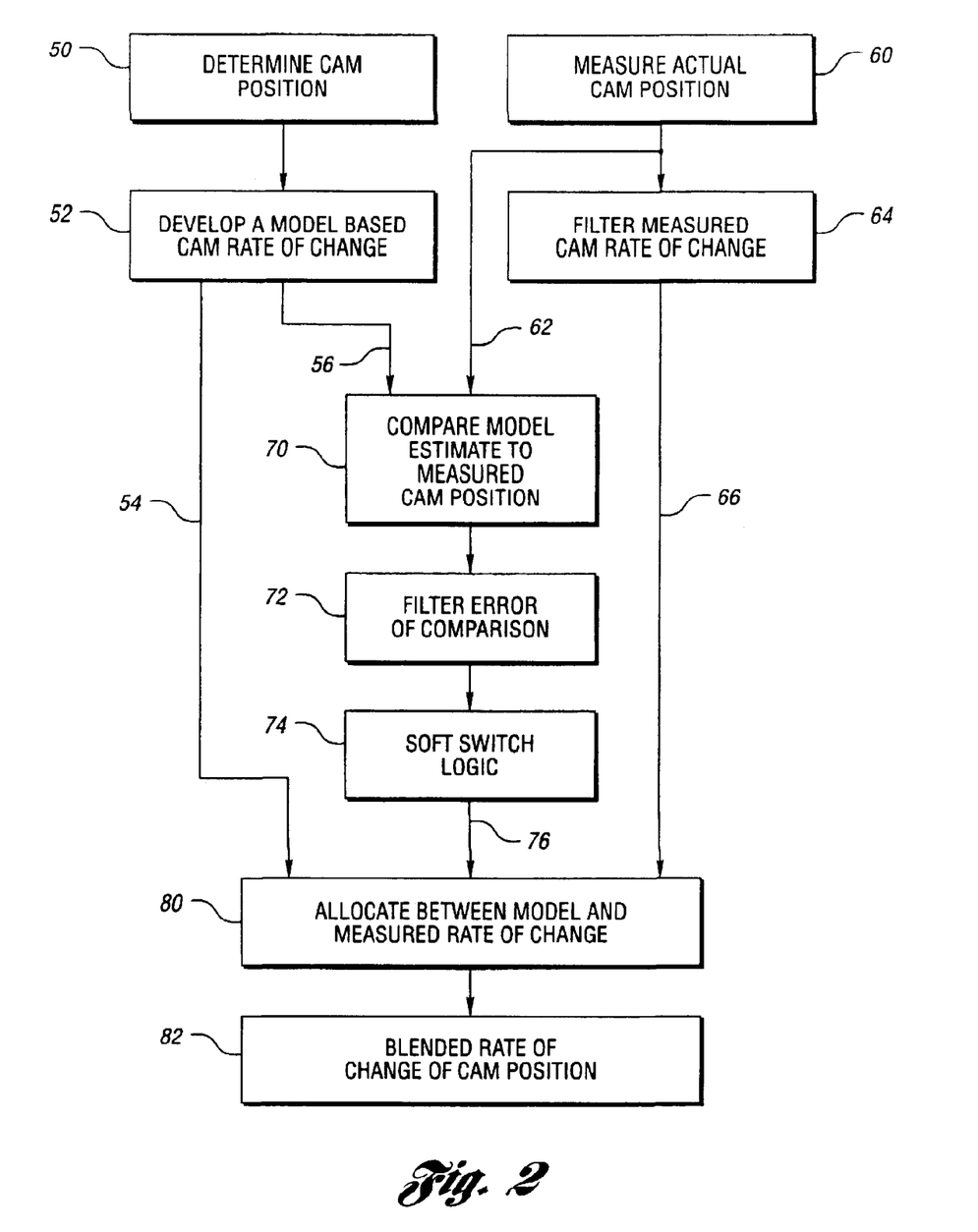
FIG. 2 is a block diagram showing the system for determining the variable cam timing rate-of-change in an engine according to the present invention.
Figure 3:
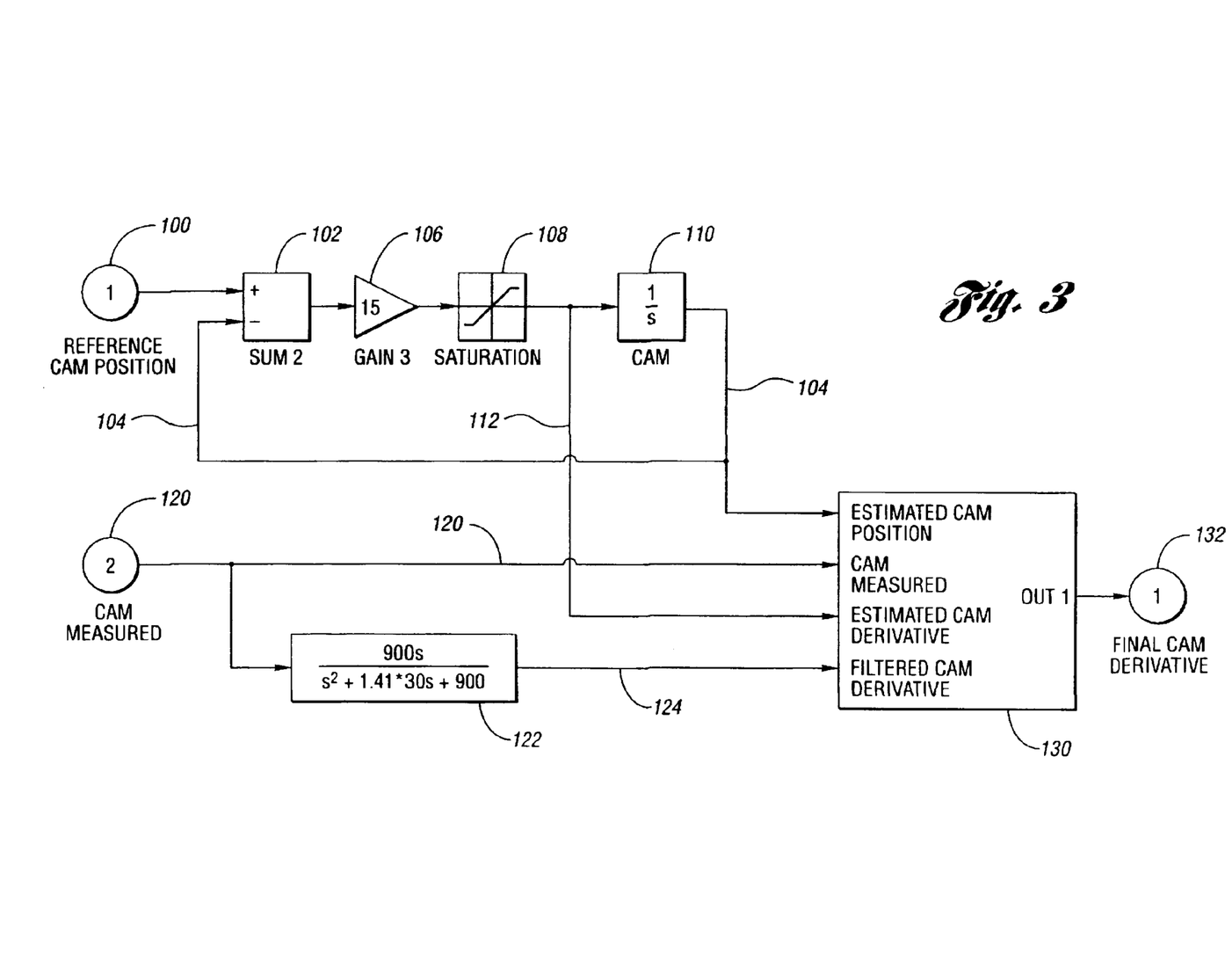
FIG. 3 more specifically illustrates the cam positions and derivatives.

Although a broad implementation of the present invention has been described above, a more specific suitable implementation is best understood with reference to FIGS. 2 and 3. Specifically, blocks 50 and 52 of FIG. 2 utilize a model to determine an estimated cam position 56 and an estimated rate of change of the cam position 54, based on the reference cam position or desired cam position.

FIG. 3 illustrates a suitable model for estimating cam position and position rate-of-change. In FIG. 3, a desired or reference cam position is indicated at 100. Summer 102 determines an error signal by subtracting the predicted cam position 104 from the referenced cam position 100. The cam position error signal from summer 102 is fed to processor 106. Processor 106 is suitably a straight gain function. The output of gain function processor 106 is supplied to limiter 108 so as to limit the predicted rate-of-change of the cam position. Specifically, the estimated cam position rate-of-change is indicated at 112. The cam position derivative is spread to integrator 110 to determine the estimated cam position 104 that is fed back to the summer 102. As understood when viewing FIGS. 2 and 3, estimated cam position 104 corresponds to line 56 of FIG. 3, and estimated cam position derivative 112 corresponds to line 54 in FIG. 2.

Further, in FIG. 2, block 60 and 64 illustrate the measuring of the actual cam position (block 60), and the filtering of the measured position (block 64) to filter out high frequency noise. Of course, it is understood that there are always some delays associated with filtering, however, embodiments of the present invention utilize a blending function of the predicted cam position derivative. This approach balances the advantages of the accuracy of an actual measurement and the low delay of a model.

More specifically, FIG. 3 illustrates a suitable implementation for filter 64 in FIG. 2. In FIG. 3, actual cam position is measured at 120. Transfer function 122 includes a second order filter multiplied (in frequency domain) with a differentiator. It is appreciated that the natural frequency and damping coefficient may vary in other suitable implementations of the present invention and that a second order Butterworth filter is merely exemplary. As shown in FIG. 3, line 120 is the actual measured cam position and line 124 is the filtered derivative of the measured cam position.

Referring back to FIG. 2, block 70 compares the measured cam position (120, FIG. 3) and the estimated cam position (104, FIG. 3). The difference between the measured cam position and the predicted cam position determines how the estimated derivative and measured filter derivative will be blended together. Because the actual cam position is a noisy signal, the absolute value of the difference from block 70 is filtered at block 72. The filter at block 72 may be suitably implemented as a first order filter that averages the previous two errors. Soft logic switch 74 in FIG. 2 determines a blend value.

Figure 4:
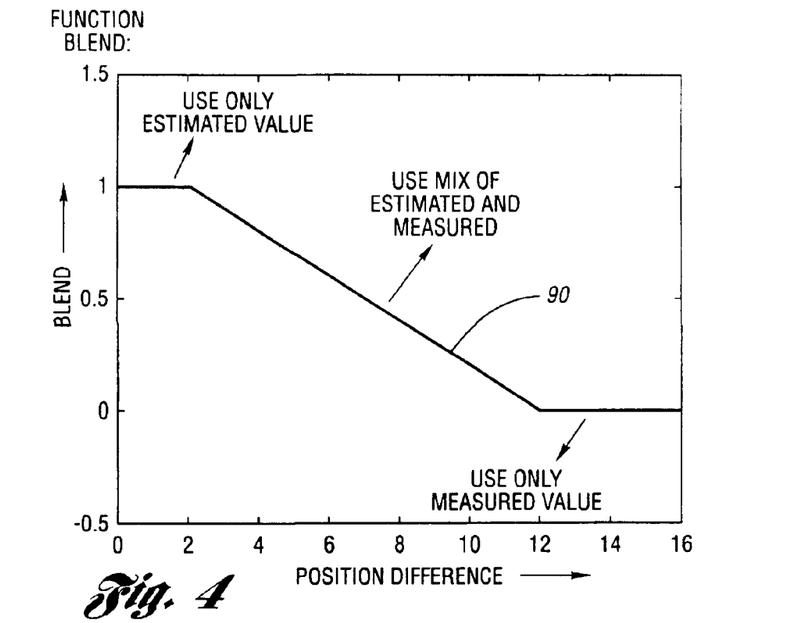
FIG. 4 is a graph of the blending function.

The determination of the blend value by soft logic switch 74 is best illustrated in FIG. 4. As shown, the blend value is lower when the position difference (filter difference at block 72) is greater. And, the blend value is higher when the position difference is smaller. Although the blend value is shown as a linear function in FIG. 4, it should be appreciated that higher order functions may be utilized to achieve the blend value. In FIG. 2, at block 80, the blend value at line 76 is used by the logic 80 to blend the cam position rate-of-change from the model 54 with the filtered measured cam rate-of-change 66.

With reference to FIG. 4, smaller position differences result in a heavier weighting of the estimated cam rate-of-change 54, while larger positioned differences result in a heavier weighting of the measured cam rate-of-change 66. In a suitable implementation, the blend value from FIG. 4 ranges from 0 to 1. Advantageously, embodiments of the present invention provide the advantage of low delay by utilizing a model based cam position, while providing the accuracy of a measured cam position.

In summary, in a suitable implementation, the method first creates an estimate of the cam position derivative that is based on a commanded signal and then blends this estimated derivative together with a conventionally filtered measured cam position signal. The system adjusts the blending by using a process term based on the difference between the estimated and measured position. The estimate of the cam phase derivative provides a prompt and reasonably accurate signal under normal warm engine operation. Engines, at times, are required to function under non-normal conditions, such as when the engine is cold or if there is insufficient oil or an actuator failure. Operating under non-normal conditions may cause the estimate of the cam phase derivative to be incorrect in its estimation of the cam actuator position and in its estimate of the cam rate-of-change. The variable cam timing actuator uses hydraulic pressure from the engine oil lubrication system. Altered actuator response times may be caused by a low oil level resulting in low pressure, a partial blockage in an oil gallery, reduced actuator oil flow, or from the use of oil having inappropriate viscosity. Cold weather conditions that occur during initial engine start-up on cold days may also impact actuator response time.

According to a method of the present invention, the measured cam phase position signal is used to reveal non-normal behavior. The system employs a combination of the estimated and measured cam phase position and rate-of-change so that it automatically adjusts to normal and non-normal conditions.

The model based cam rate-of-change at 52 then creates an estimate of the cam position derivative using a simple model of the actuation device. The VCT phasing actuator acts as a rate-limited, first order, low pass filter when commanded to a VCT phase position. The model representation below is a relatively simple model. More or less elaborate models could also be developed that would provide an estimate of the cam position derivative. The model can be expressed in a computer-implemented algorithm as follows:

$$est\_cam\_derv(k)=Funct\_sat\_lim[actuator_{13}\ gain*(cam\_ph\_d(k)-est\_cam\_pos(k-1))]$$

$$est\_cam\_pos(k)=del\_t*est\_cam\_derv(k-1)+est\_cam\_pos(k-1))$$

where:
index k corresponds to the present computer sample;
k−1 corresponds to the computer's previous loop algorithm sample;
est_cam_derv is an estimate of the derivative of the cam phase position;
Funct_sat_lim is a function that limits the quantity inside the brackets to an upper and lower set of values;
Actuator_gain is a fixed value determined through either physical modeling of the actuator or through experiment on the actuator;
Cam_ph_d is the commanded or desired value for the cam phase position;
Est_cam_pos is the estimate of the cam phase position; and
del_t is the time between processor updates of the algorithm.

The above model could be modified by removing the rate limiting or by the addition of higher order response terms or time delays that may be appropriate choices, depending upon the VCT actuator.

The measured actual cam position at 60 and estimated cam position signal at 56 are used to reject noise having a limited amplitude due to the limitations of the sources of the noise. Camshaft flex, signal noise, and timing chain stretching only introduce several degrees of cam phase error, but they are introduced at a high rate-of-change. The rapid small fluctuations of cam phase are considered to be noise whether they physically occur or are the result of sensor errors. Compensation by the control system in air flow will have a negligible response to this type of VCT change. On the other hand, a prompt derivative of the VCT position is required to cope with large VCT changes. It can be promptly determined if the cam change is significant or not, and the system can be caused to react accordingly by determining the difference between the cam measurement base position and the estimated position.

In addition to the model-based estimate of the cam phase rate-of-change determined above, the method also requires a conventionally filtered signal based on the measured sensor value of the cam position. A second order Butterworth filter is used to low pass filter the signal before calculating the rate-of-change. The result of the measured/processed cam derivative is referred to as cam_meas_derv. The discrete time equations for the second order filter are as follows:

$$CD\_NF\_DT=del\_t*CD\_nat\_freq$$

$$CD\_X1(k)=CD\_X1(k-1)+CD\_NF\_DT*CD\_X2(k-1)$$

$$CD\_X2(k)=(1-2*CD\_damping*CD\_NF\_DT)*CD\_X2(k-1)+CD\_NF\_DT*(cam\_actual-CD\_X1(k-1))$$

$$cam\_meas\_derv = CD\_nat\_freq * CD(X2(k-1))$$

where CD_nat_freq is adjustable for the cutoff frequency of the low pass filter and the CD_damping adjusts the second order damping. The k or k−1 indices refer to current and past values of the states of variables of the filter that result when a continuous frequency domain filter is transformed into a discrete(for microprocessor implementation) approximation.

The difference between the two types of cam positions are calculated and a term is calculated that will govern the blending of the measurement based and estimated cam derivative. An approximate first order filter is used to process the difference in measured versus estimated positions to further suppress noise that is outside the bandwidth of the intake manifold of the engine. The formula is as follows:

$$fk(k) = \frac{del\_t}{del\_t + TC\_est\_cam}$$

$$abs\_diff(k) = |est\_cam\_pos(k) - cam\_meas(k)|$$

$$pos\_diff(k) = fk(k) * abs\_diff(k) + (1 - fk(k)) * pos\_diff(k-1)$$

where:
  fk is the filter constant based on the update rate del_t and the time constant determined from the engine models; and
  Pos_diff is the result of filtering the absolute difference, which will determine the blending of the estimated versus the measured based derivative.

For small amplitude differences, less than 2 degrees, the system relies on the estimated cam derivative because the derivative based on measurements will contain noise at this amplitude. For large amplitude differences, of about 12 or more degrees, the measured value captures real and unexpected (un-modeled) cam behavior which should be responded to by the control system. For values that fall between 2 and 12 degrees, the system blends the estimated and measured cam derivatives. The exact range of cam position differences is system-dependent.

The blending function can be expressed as follows:

$$blend(k) = funct\_blend(pos\_diff(k))$$

$$cam\_derv(k) = blend(k) * est\_cam\_derv(k) + (1 - blend(k)) * cam\_meas\_derv(k).$$

The function funct_blend graphed in FIG. 4, maps values of position difference to a percent of the blending between the two types of derivative values. The line plot 90 is the function of the estimated cam derivative that will be used in the final output of the cam derivative.

Figure 5:
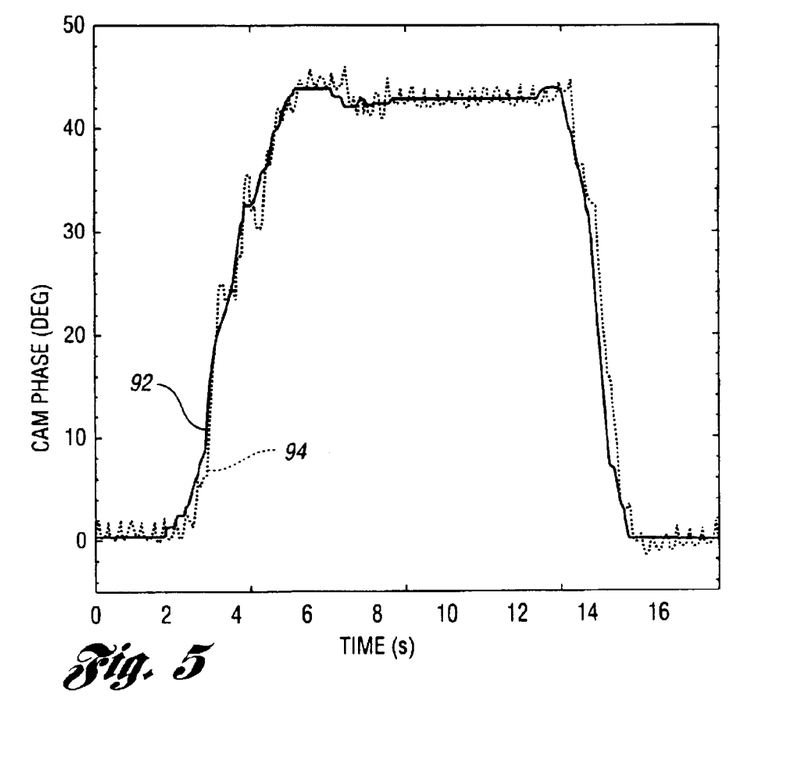
FIG. 5 is a graph of the time responses of the cam timing model and the actually measured cam position.

The potential improvement of the model may be seen with reference to FIG. 5 wherein the model-based estimate of position is shown in a solid line 92 with the measured position being presented in the dotted line 94. The plot is of cam phase response versus time for the model and the actual measured cam phase. The large motion responses of the two are very similar. However, the model has the advantage of providing between 50–100 milliseconds lead time. The presence of high frequency oscillations in the measured cam phase would require additional filtering of this signal before its derivative could be used that would further increase the phase lag.

Figure 6:
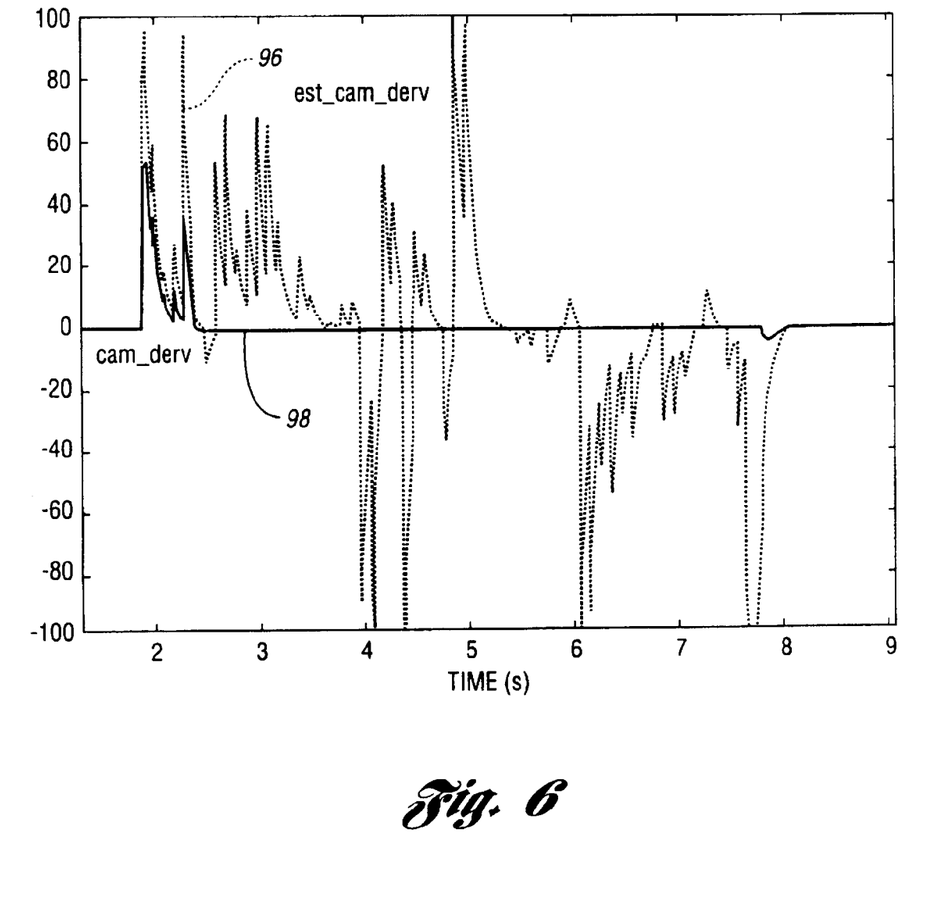
FIG. 6 is a graph of the model-based estimate of the cam phase rate-of-change and the combined model/measurement estimate.

The use of a model-based estimate is justified if the model response remains close to the actual measured cam phase rate-of-change. If the actual cam timing does not follow the desired cam reference, a significant difference between the model and the actual response is indicated. In this case, the performance of the method described in the invention can be judged by how fast the system determines the discrepancy and starts using the measured signal. FIG. 6 illustrates this aspect of the algorithm performance in the case when the cam phase remains at zero degrees while the cam reference is based on actual vehicle operation. The dotted curve 96 corresponds to the model-based estimate of the cam phase rate-of-change est_cam_derv, while the solid curve 98 is the cam_derv signal that combines the model- and measurement-based estimates.

Referring to FIG. 6, after about 0.6 seconds, the system recognizes that the model-based derivative estimate is incorrect and switches to the measurement-based one, which in this case is equal to zero. During the 0.6 seconds, the cam_derv signal is much smaller (much closer to the measured) than the est_cam_derv signal because of the soft switch capabilities of the algorithm.

While the best mode for carrying out the invention has been described in detail, those familiar with the art to which this invention relates will recognize various alternative designs and embodiments for practicing the invention as defined by the following claims.

What is claimed is:

1. A method of controlling an engine having an engine controller that controls the flow of intake and exhaust gases in a combustion process of the engine, comprising:
  calculating a first cam position and a first rate-of-change of the cam position;
  measuring a second cam position and a second rate-of-change of the cam position;
  comparing the first cam position to the second cam position;
  blending the first rate-of-change of the cam position and the second rate-of-change of the cam position to establish a blended rate of change of the cam position based upon the comparison; and
  adjusting the engine controller dependent upon the blended rate-of-change of the cam position.

2. The method of claim 1 wherein the algorithm for calculating the first cam position and the first rate-of-change of the cam position is:

$$est\_cam\_derv(k) = Funct\_sat\_lim[actuator_{13} gain * (cam\_ph\_d(k) - est\_cam\_pos(k-1))]$$

$$est\_cam\_pos(k) = del\_t * est\_cam\_derv(k-1) + est\_cam\_pos(k-1)).$$

3. The method of claim 2 wherein an algorithm for the blending step is:

$$blend(k) = funct\_blend(pos\_diff(k))$$

$$cam\_derv(k) = blend(k) * est\_cam\_derv(k) + (1 - blend(k)) * cam\_meas\_derv(k).$$

4. The method of claim 1 wherein the engine controller is an electronic throttle control.

5. The method of claim 1 wherein the engine has a dual equal cam with equal phase intake and exhaust cams that are advanced and retarded equally.

6. The method of claim 1 wherein when the comparison of the first cam position to the second cam position results in a difference below a low threshold value, the engine controller uses the first cam position and first rate-of-change of the cam position.

7. The method of claim 6 wherein when the comparison of the first cam position to the second cam position results in a difference above a high threshold value, the engine controller uses the second cam position and second rate-of-change of the cam position.

8. The method of claim 7 wherein when the comparison of the first cam position to the second cam position results in a difference between the low threshold value and the high threshold value, the engine controller uses the blended rate-of-change based on the comparison and further based upon the first rate-of-change and the second rate-of-change of the cam position.

9. In an internal combustion engine having a crankshaft and a camshaft, the engine including a variable phase cam timing system that alters a phase relationship between the camshaft and the crankshaft, a method of determining a blended rate-of-change of a cam position, the method comprising:

determining a reference cam position;

utilizing a model to determine an estimated cam position and an estimated rate-of-change of the cam position based on the reference cam position;

measuring an actual cam position;

determining a filtered rate-of-change of the actual cam position;

comparing the model estimated cam position to the measured actual cam position;

determining the blended rate-of-change of the cam position based on the comparison, and further based on the estimated rate-of-change of the cam position and the filtered rate-of-change of the cam position.

10. The method of claim 9 wherein when the comparison of the model estimated cam position to the measured actual cam position results in a difference below a low threshold value, the engine determines the blended rate-of-change of the cam position as the estimated rate-of-change of the cam position.

11. The method of claim 9 wherein when the comparison of the model estimated cam position to the measured actual cam position results in a difference above a high threshold value, the engine determines the blended rate-of-change of the cam position as the filtered rate-of-change of the cam position.

12. The method of claim 11 wherein when the comparison of the model estimated cam position to the measured actual cam position results in a difference between the low threshold value and the high threshold value, the engine determines the blended rate-of-change based on the comparison as a blend of the model estimated rate-of-change of the cam position and the filtered rate-of-change of the cam position.

13. A system for determining the rate-of-change of a cam position for an internal combustion engine having a crankshaft and a camshaft, the engine including a variable phase cam timing system that alters a phase relationship between the camshaft and the crankshaft, the system comprising:

a data processor having a model for determining an estimated cam position relative to a reference cam position and an estimated rate-of-change of the cam position;

a sensor for measuring an actual cam position;

the data processor having a filtering algorithm for determining a filtered rate-of-change of the actual cam position;

the data processor comparing the estimated cam position to the measured actual cam position; and the data processor determining a blended rate-of-change of the cam position based upon the comparison, and further based on the estimated rate-of-change of the cam position and the filtered rate-of-change of the cam position.

14. The system of claim 13 wherein the engine uses the blended rate-of-change determined to control an electronic throttle control.

15. The system of claim 13 wherein the engine has a dual equal cam with equal phase intake and exhaust cams that are advanced and retarded equally.

* * * * *